(No Model.)
J. F. FORD.
TESTING BAND.
No. 508,609. Patented Nov. 14, 1893.
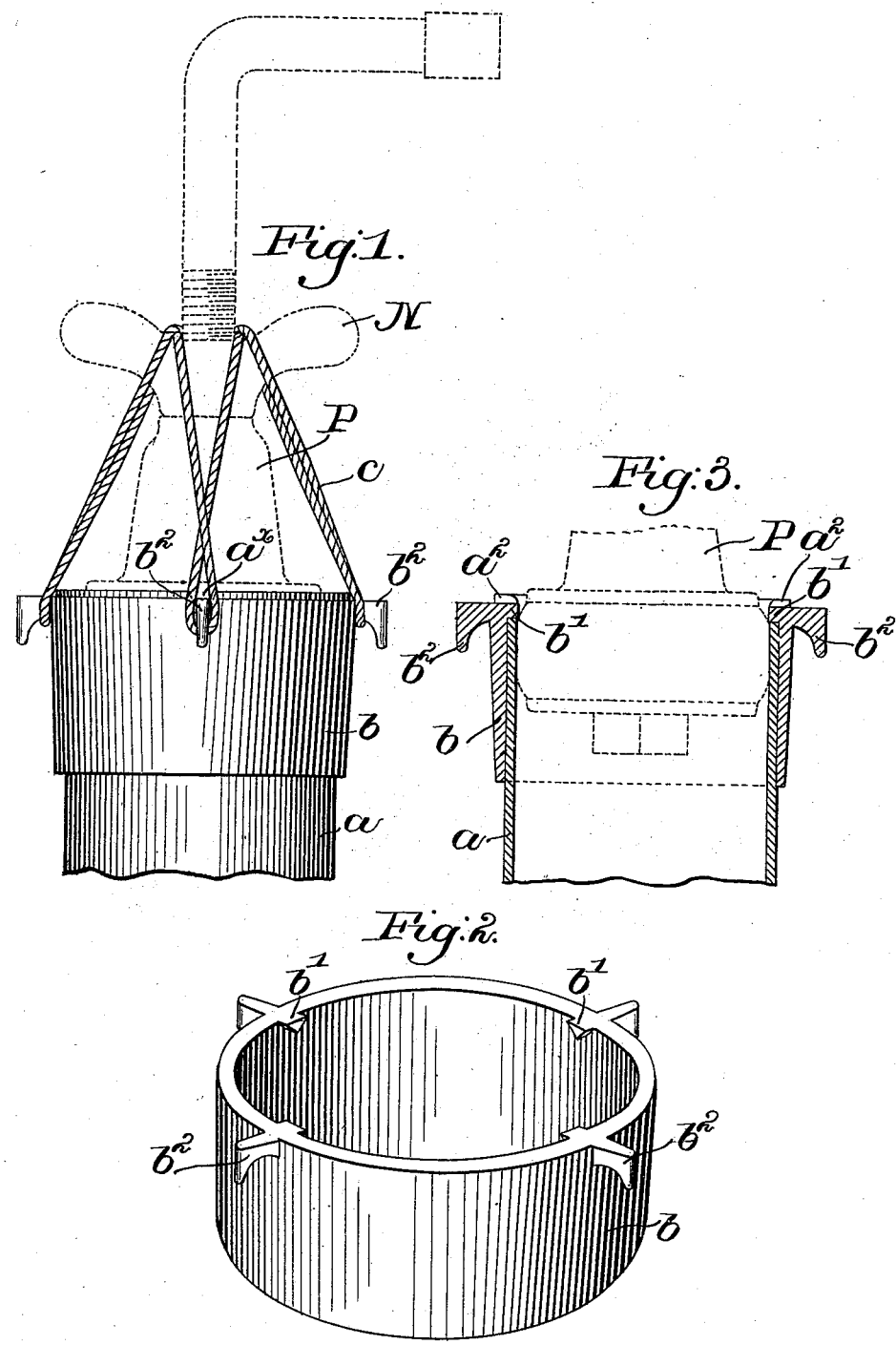
Witnesses.
Louis N. Gruell
Edward F. Allen
Inventor
John F. Ford.
by Crosby & Gregory
Attys

UNITED STATES PATENT OFFICE.

JOHN F. FORD, OF CAMBRIDGE, MASSACHUSETTS.

TESTING-BAND.

SPECIFICATION forming part of Letters Patent No. 508,609, dated November 14, 1893.

Application filed July 29, 1893. Serial No. 481,809. (No model.)

*To all whom it may concern:*

Be it known that I, JOHN F. FORD, of Cambridge, county of Middlesex, State of Massachusetts, have invented an Improvement in Testing-Bands, of which the following description, in connection with the accompanying drawings, is a specification, like letters on the drawings representing like parts.

In the construction of buildings it is necessary to test the plumbing therein previous to acceptance, and it is usual in testing the pipes to close the openings therein by plugs of well known construction and subject the pipes to pressure. The plugs commonly used are provided with means to expand them when inserted in the pipe, to tightly close the same, and when the pipe is of iron or other rigid, unyielding metal no trouble is experienced. Should, however, such a plug be inserted in a lead pipe, as in the end of a trap, for instance, much difficulty would be experienced in obviating rupturing or straining the pipe end, due to softness of the lead, and inasmuch as the plug could not be fully expanded it would be liable to fly out when pressure was applied to the pipe. In testing lead pipes it is usual to solder a temporary cover on the open end of the trap or bend, and the pressure is applied. After the testing the cover is sawed off, and my invention enables plugs to be used with lead pipes in bends, traps, &c., equally well as if the pipe had been iron or other rigid metal.

This invention has for its object the production of a simple device which can be readily applied to and removed from a pipe end to be tested, which prevents any rupture of the pipe and also provides means for securing the plug so that it cannot be forced out by pressure in the pipe.

In accordance therewith my invention consists in a rigid metallic sleeve adapted to surround the pipe to be tested around the test plug, and thereby prevent rupture or strain of the pipe, substantially as will be described.

Other features of my invention will be hereinafter described and particularly pointed out in the claims.

Figure 1 in side elevation represents a pipe end with my invention applied thereto, the testing plug being shown in position, in dotted lines. Fig. 2 is a perspective view of the testing band detached, and Fig. 3 is a vertical sectional view of the parts shown in Fig. 1, the cord being omitted.

The plug P, see dotted lines Figs. 1 and 3, is of well known construction, and forms no part of my invention, said plug being expanded when inserted in the pipe end by rotating the thumb nut N, Fig. 1. A testing band $b$, of cast iron, brass, or other rigid and stiff metal, and of sleeve-like form, is placed upon the exterior of the pipe $a$ to be tested, as shown in Figs. 1 and 3.

The sleeve $b$ as herein shown is provided at its top with inturned lugs $b'$, four such lugs being shown, and the end of the pipe $a$ is notched, as at $a^x$, Fig. 1, to receive the lugs, the notches being of such depth that the top of the pipe $a$ projects a slight distance beyond the end of the sleeve or band $b$. The lugs resting in the notches retain the sleeve in place on the pipe, and the plug P can then be expanded until the end of the pipe $a$ is completely closed.

The sleeve or band $b$ fits the pipe snugly around the plug and resists the outward pressure of the plug, so that the pipe cannot be ruptured or strained, and when the test is completed the band and plug can be readily removed. In order to provide means for holding the plug in place and preventing any possibility of its being blown out I have shown the sleeve as provided with external ears or projections $b^2$, under which a cord or rope $c$ may be passed and secured to the plug, as shown in Fig. 1. The projecting end of the pipe is bent over on the sleeve $b$, as at $a^2$, Figs. 1 and 3, and gives additional hold to the latter, resisting longitudinal pull. The flange $a^2$ so formed can be easily bent up or cut off when the sleeve is to be removed.

By the use of the testing band described the soldering on of a cover to the end of the pipe is obviated, the band can be readily and quickly applied and removed, and is always ready for use. A set of assorted sizes can be kept on hand, for use with different sizes of plugs and pipes.

The number of lugs or ears is immaterial, though I have found four very convenient, and the ears $b^2$ may be omitted if desired.

I claim—

1. A testing band for pipes, consisting of a rigid metallic sleeve adapted to surround the pipe to be tested, and inturned lugs on said sleeve to rest upon the open end of the pipe and retain the sleeve in place, substantially as described.

2. A testing band for pipes, consisting of a rigid metallic sleeve adapted to snugly surround the end of the pipe, and inturned lugs on the upper end of said sleeve, to rest in notches in the pipe end and retain the sleeve in place, substantially as described.

3. A testing band for pipes, consisting of a rigid metallic sleeve adapted to surround the pipe around the test plug, inturned lugs on said sleeve to rest upon the open end of the pipe and retain the sleeve in position on the pipe, and external ears on said sleeve adapted to be secured to the plug by a flexible connection, substantially as described.

4. A testing band for pipes, consisting of a rigid sleeve adapted to surround the open end of the pipe around the test plug and thereby prevent rupture, held in place by the overturned end of the pipe, combined with an expansible test-plug placed within the end of the pipe and projecting beyond it, external ears on the sleeve, and connections between said ears and the projecting portion of the plug, to hold the latter against longitudinal pressure, substantially as described.

In testimony whereof I have signed my name to this specification in the presence of two subscribing witnesses.

JOHN F. FORD.

Witnesses:
GEO. W. GREGORY,
JOHN C. EDWARDS.